(12) United States Patent
Matsuda

(10) Patent No.: US 6,244,983 B1
(45) Date of Patent: Jun. 12, 2001

(54) SILENT CHAIN WITH INNER FLANK ENGAGEMENT LINKS AND SPROCKET HAVING TEETH WITH MATCHING SURFACES

(75) Inventor: Akio Matsuda, Hisai (JP)

(73) Assignee: Borg-Warner Automotive K.K., Nabari (JP)

( * ) Notice: Subject to any disclaimer, the term of this patent is extended or adjusted under 35 U.S.C. 154(b) by 0 days.

(21) Appl. No.: 09/372,466

(22) Filed: Aug. 11, 1999

(30) Foreign Application Priority Data

Aug. 21, 1998 (JP) .................................. 10-251927

(51) Int. Cl.[7] .............................. F16H 7/06; F16G 13/04
(52) U.S. Cl. ..................... 474/155; 474/156; 474/212; 474/213
(58) Field of Search ....................... 474/212, 213, 474/214, 217, 216, 206, 202, 211, 84, 85, 155–157, 88, 210; 59/84

(56) References Cited

U.S. PATENT DOCUMENTS

| | | | |
|---|---|---|---|
| 1,816,473 | * 7/1931 | Dull et al. ............................ | 474/157 |
| 1,865,844 | * 7/1932 | Dull et al. ............................ | 474/213 |
| 1,919,768 | * 7/1933 | Brandt .................................. | 474/157 |
| 4,342,560 | 8/1982 | Ledvina et al. . | |
| 4,509,323 | 4/1985 | Ledvina et al. . | |
| 4,509,937 | 4/1985 | Ledvina et al. . | |
| 4,758,209 | 7/1988 | Ledvina . | |
| 4,759,740 | * 7/1988 | Cradduck ............................. | 474/212 |
| 4,832,668 | 5/1989 | Ledvina et al. . | |
| 4,906,224 | 3/1990 | Reber . | |
| 4,915,676 | 4/1990 | Komeya . | |
| 5,154,674 | 10/1992 | Avramidis et al. . | |
| 5,236,400 | * 8/1993 | Tsuyama ............................. | 474/217 |
| 5,419,743 | 5/1995 | Takeda et al. . | |
| 5,453,059 | 9/1995 | Avramidis et al. . | |
| 5,628,702 | 5/1997 | Kotera . | |
| 6,077,181 | * 6/2000 | Kanehira et al. .................... | 474/212 |

FOREIGN PATENT DOCUMENTS 61-211556 * 9/1986 (JP) .
8-184348   7/1996 (JP) .

* cited by examiner

Primary Examiner—David A. Bucci
Assistant Examiner—Maran Charles
(74) Attorney, Agent, or Firm—McAndrews, Held & Malloy, Ltd.; Greg Dziegielewski

(57) ABSTRACT

A silent chain and sprocket combination includes a silent chain having a plurality of interleaved links, each link having a pair of teeth, with each tooth having an inner flank and an outer flank. The links of the chain engage the sprocket teeth on their inside flanks during initial engagement and full engagement. The sprocket tooth has a flank shape with a first part that matches the lower portion of the shape of the inside flank of the link tooth and a sprocket tooth flank shape with a second part that matches the upper part of the link tooth shape.

2 Claims, 8 Drawing Sheets

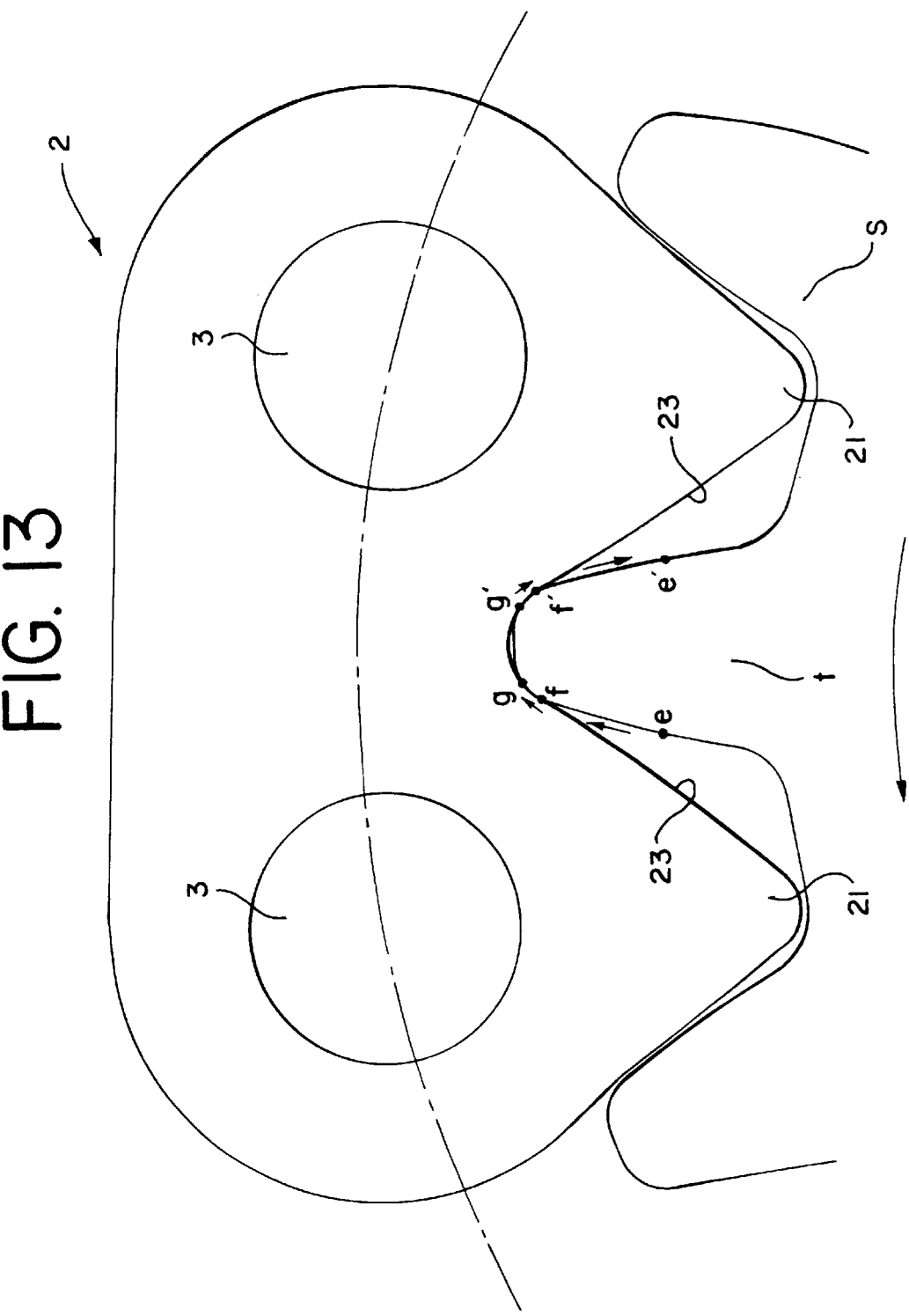

SILENT CHAIN WITH INNER FLANK ENGAGEMENT LINKS AND SPROCKET HAVING TEETH WITH MATCHING SURFACES

BACKGROUND OF THE INVENTION

This invention is related to a silent chain power transmitting device formed by a combination of a silent chain and sprocket. The silent chain is formed of a plurality of interleaved links. Each link has a pair of depending teeth joined at a crotch. Each tooth has an inside flank and an outside flank. The links are interleaved and are connected by connecting pins inserted through pin holes or apertures formed in each link. The teeth of the silent chain engage with teeth formed on an associated sprocket. In particular, this invention is related to a silent chain transmission device with reduced noise from impact engagement and vibration during operation.

Silent chain is typically used in automobiles, motorcycles and other vehicles to transmit power. The silent chain usually includes rows of multiple links interleaved in an endless loop wrapped around a pair of sprockets. During operation, one of the flank sides of the teeth on the link engages with the teeth on the sprocket to transmit power from the driving sprocket to the driven sprocket.

When using a conventional silent chain, engagement between the chain and the sprocket generates noise. In order to reduce noise, it is preferable to have smooth contact between the link and the sprocket. The engaging vibration or chordal action of the chain during engagement is also one of the causes of noise. In order to reduce the engaging vibration, the chain should maintain a linear movement until it engages with the sprocket. Therefore, it is believed that chain noise can be significantly reduced if the chain can maintain its linear movement and then smoothly engage with the sprocket.

In other words, the movement of the silent chain and the sprocket are very like the movement of a rack-type cutter. The linear part of the silent chain can be considered similar to a rack cutter that moves across a sprocket and the sprocket can be considered as the gear cut by the rack cutter.

Based on the above consideration, the inventor proposed a silent chain transmission device in Japanese laid-open application no. (Kokai) Hei 8-184348. In that silent chain, the flank side of the tooth on each link series which engages with a sprocket when the silent chain is extended in a linear form has the same shape as the part of the tooth shape of a rack cutter capable of generating the sprocket, and the sprocket has a tooth shape generated by such a rack cutter. As a result, the silent chain is able to maintain its linear movement and contact smoothly and then engage with the sprocket with minimal vibration during engagement.

By using such a silent chain transmission device, the noise generated by the impact of the chain on the sprocket and the engaging vibration, including the low-frequency noise, can be suppressed. In addition, since the rotation of the links within the link rows is proportional to the angle of rotation of the sprocket, the irregularity in angular velocity can be prevented.

In a series of studies on the reduction of the noise generated by a silent chain during operation it was found that the noise is generated not only in the initial stage of the engagement but also when the chain and the sprocket are fully engaged.

Especially for the silent chain with a structure using the inside flank for initial engagement but the outside flank for full engagement, the noise level reaches its peak when the chain and the sprocket are fully engaged. This may be explained by sudden increase of the load on the engaging point when the engaging point shifts from the inside flank to the outside flank.

However, the silent chain proposed in the prior art laid-open publication mentioned above has been designed to reduce the noise only in the initial stage of the engagement. The noise problem when the chain and the sprocket are fully engaged is not addressed by that chain.

In consideration of the situation described above, the purpose of this invention is to reduce the noise for a silent chain transmission device not only in the initial stage of the engagement but also when the chain and the sprocket are fully engaged, and to provide a silent chain with minimal vibration during engagement.

SUMMARY OF THE INVENTION

In a first embodiment, the present invention includes a silent chain comprising multiple interleaved links. Each link has a pair of teeth with an inner flank and an outer flank. The links are interconnected by connecting pins. A sprocket is used together with the silent chain.

In one embodiment, the inner flank of the link tooth contacts the tooth of the sprocket when the silent chain is extended in a linear direction as well as when the chain is wound on the sprocket. The first part of the tooth surface on the sprocket which contacts the silent chain in the initial stage of the engagement has a tooth shape the same as the envelope for the locus of the lower part of the inner flank of the chain link which engages the sprocket when the silent chain has a linear movement with minimal engaging vibration. The second part of the tooth surface on the sprocket which contacts the silent chain at the full engagement or seating in the sprocket has a tooth shape the same as the envelope for the locus of the upper part of the inner flank of the chain link which engages with the sprocket when the silent chain is wound on the sprocket and the link has a rotary movement.

As noted above, the first part of the tooth surface on the sprocket, which contacts the silent chain in the initial stage of the engagement, has a tooth shape which is the same as the envelope for the locus of the lower part of the inner flank which engages with the sprocket when the silent chain has a linear movement without engaging vibration. As a result, when the silent chain maintains a linear movement towards the sprocket, the link has a smooth contact with the sprocket and is able to engage with the sprocket with minimal impact and causing minimal engaging vibration. Therefore, the noise caused by the impact of the link on the sprocket during the initial stage of the engagement can be minimized.

Next, as the engagement progresses and the silent chain is wound or seated on the sprocket, the upper part of the inner flank of the link contacts the second part of the tooth surface on the sprocket, due to the rotation of the link around the tooth of sprocket. In other words, the silent chain has a structure using the inside for both initial engagement and full engagement. In this case, the engaging point between the link and the sprocket is always on the inner flank from initial engagement to full engagement. As a result, the chain of this invention will not have the sudden increase of load on the engaging point due to the shift of the engaging point observed for the chain structure using the inside flank for initial engagement but the outside flank for full engagement.

In addition, the loading on each tooth of the sprocket can be decreased and the lifetime of the sprocket can be extended. Moreover, the second part of the tooth surface on the sprocket has a tooth shape which is the same as the envelope for the locus of the upper part of the inner flank when the link has a rotary movement. As a result, when the silent chain is wound on the sprocket, the upper part of the inner flank engages with the second part of the tooth surface on the sprocket as the link rotates around the tooth of the sprocket. Therefore, the impact of the link on the tooth of the sprocket at full engagement can be minimized and the noise generated can be minimized.

A second embodiment of the present invention concerns a silent chain described in the first embodiment and is further characterized by the fact that the first part and the second part of the tooth surface on the sprocket are connected through a curved surface.

According to the present invention, the noise generated by the silent chain transmission device can be reduced not only in the initial stage of the engagement but also when the chain and the sprocket are fully engaged, and the vibration properties of the silent chain transmission device can be improved. Moreover, the first part and the second part of the tooth surface on the sprocket are connected through a curved surface, such as a circular arc.

In the following, this invention is explained in more detail with practical examples shown in the figures.

BRIEF DESCRIPTION OF THE DRAWINGS

FIG. 13 shows the movement of the engaging point on the sprocket tooth surface for the silent chain of the present invention.

DETAILED DESCRIPTION OF THE PREFERRED EMBODIMENTS

Figure 1:
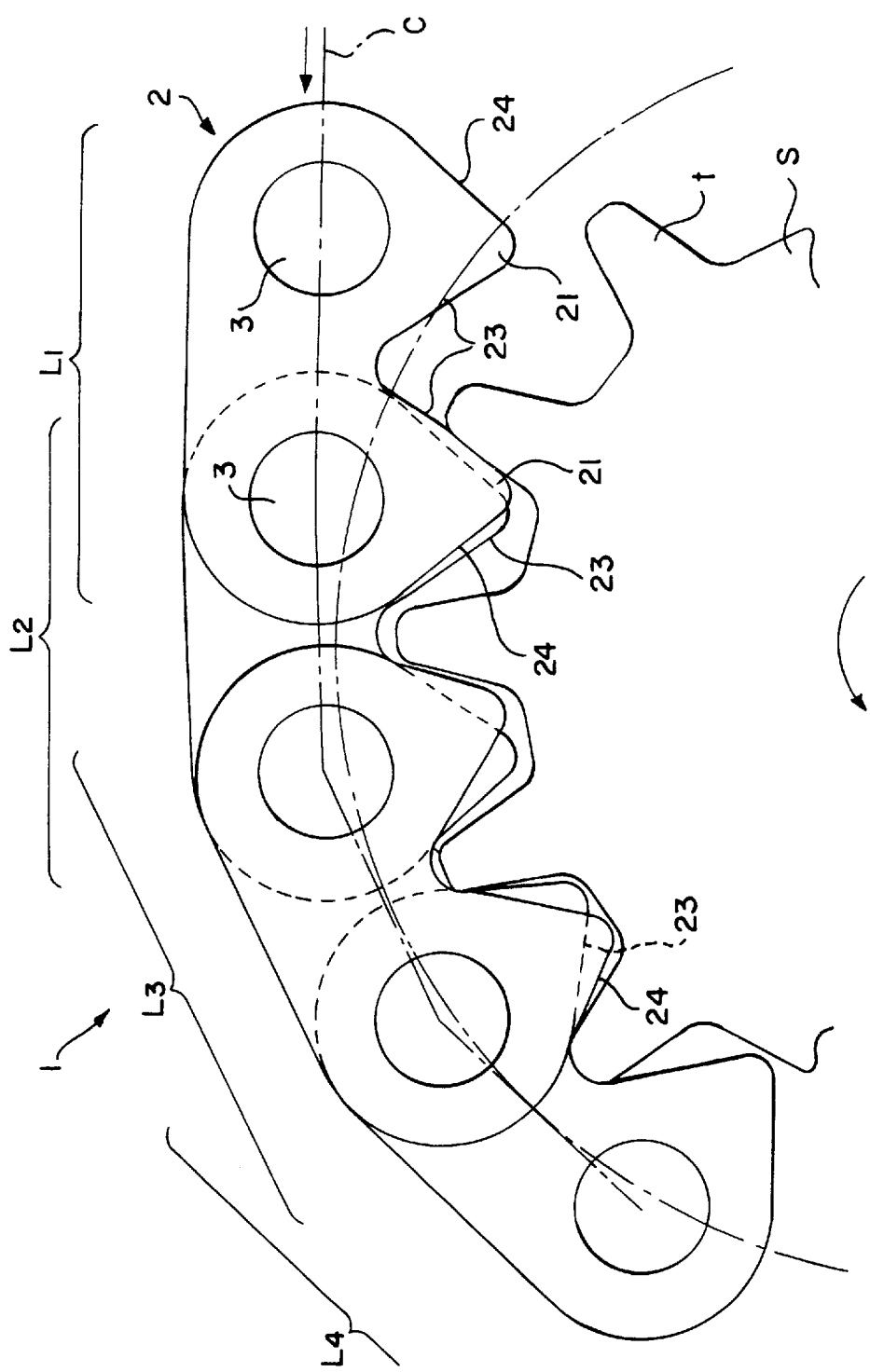
FIG. 1 shows the side view of the silent chain transmission device of one example of the present invention.

As shown in FIG. 1, silent chain 1 is formed by link rows or series L1, L2, L3, L4 . . . connected by connecting pin 3 and each link series consists of multiple links 2. Each link 2 carries a pair of teeth 21 on one side of pinhole central line C. Tooth 21 consists of the inner flank 23 and outer flank 24.

In the figure, link series L1 is the frontmost series in the linear span of silent chain 1 which maintains a linear movement towards sprocket S. Inner flank 23 starts to engage with sprocket tooth t. Link series L2 is in the initial stage of the engagement due to the linear movement of silent chain 1. Link series L3 is also in the initial stage of the engagement due to the rotary movement of link 2 when silent chain 1 is wound on sprocket S. Link series L4 is in the full engagement with sprocket tooth t.

As shown in FIG. 1, inner flank 23 of each link series always contacts sprocket tooth t, regardless of whether silent chain 1 is in a linear state or wound on sprocket S. In other words, the contacting point between inner flank 23 and sprocket tooth t is separated from outer flank 24 of the adjacent link series.

Figure 2:
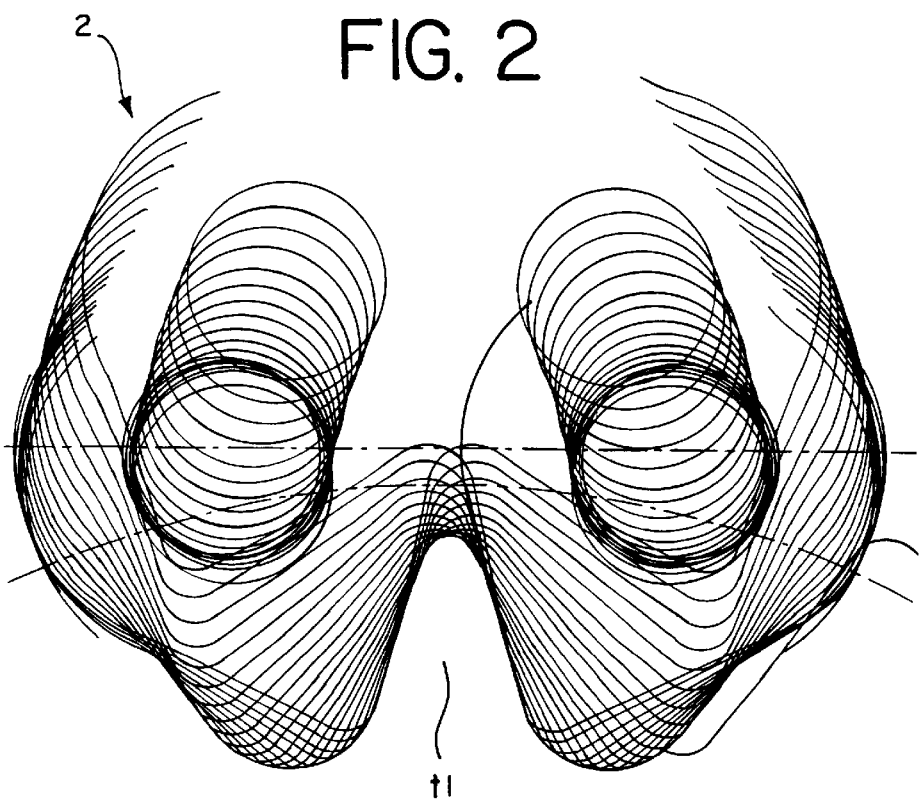
FIG. 2 shows the sprocket tooth surface curve generated by the link when the silent chain maintains a linear movement towards the sprocket.

FIG. 2 shows the locus of link 2 when silent chain 1 maintains a linear movement towards sprocket S and the link starts to engage sprocket tooth t. The figure provides the locus of the movement of link 2 relative to the sprocket. Area t1 defined by the inner flank of link 2 indicates the sprocket tooth surface curve generated by the linear movement of silent chain 1.

Figure 3:
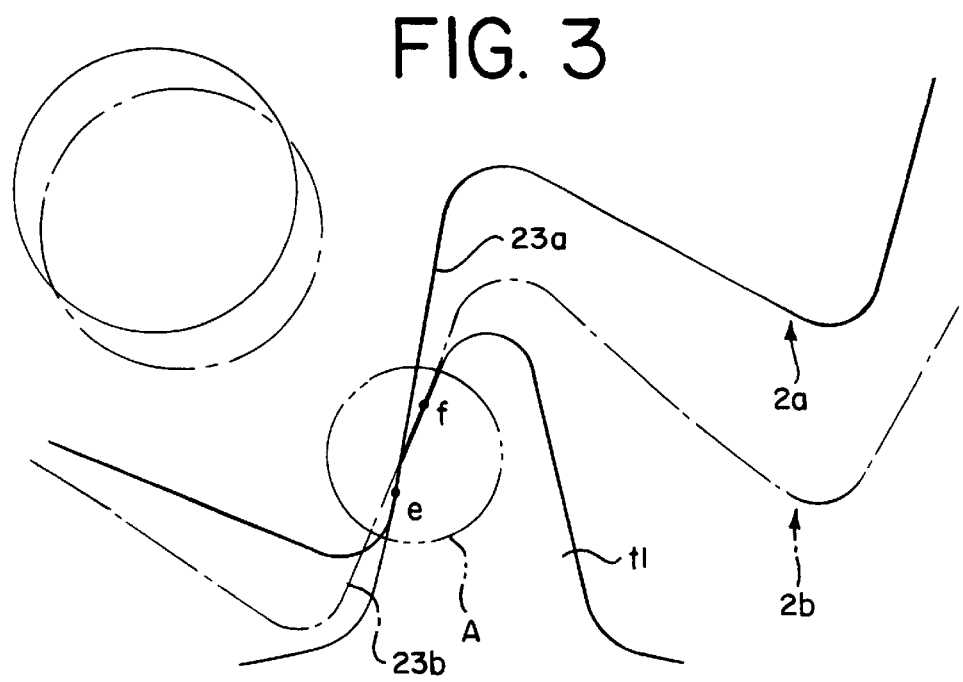
FIG. 3 shows a part of the locus shown in FIG. 2 from the starting point to the end point of the initial engagement with the sprocket tooth surface.

FIG. 3 shows a part of the locus of link 2 generated by the linear movement shown in FIG. 2 from the starting point to the end point of the initial engagement with the sprocket tooth surface. The solid line shows the starting point of the initial engagement and the dot-dash line shows the end point of the initial engagement due to the linear movement. Inner flank 23a of link 2a shown in the solid line contacts sprocket tooth t1 at contacting point e, while inner flank 23b of link 2b shown in the dot-dash line contacts sprocket tooth t1 at contacting point f.

Figure 4:
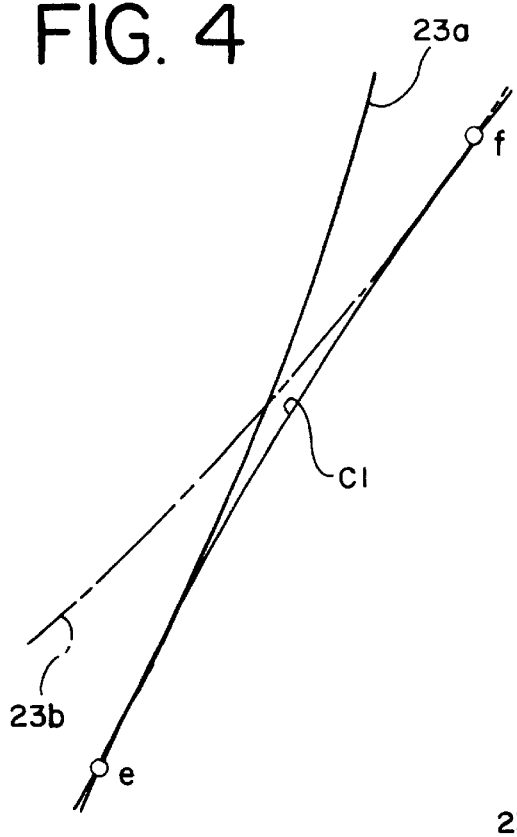
FIG. 4 shows part A of FIG. 3, enlarged.

FIG. 4 shows enlarged part A of FIG. 3. In the figure, sprocket tooth surface c1 of sprocket tooth t1 between contacting points e and f contacts both inner flanks 23a and 23b, forming the envelope of them.

Figure 5:
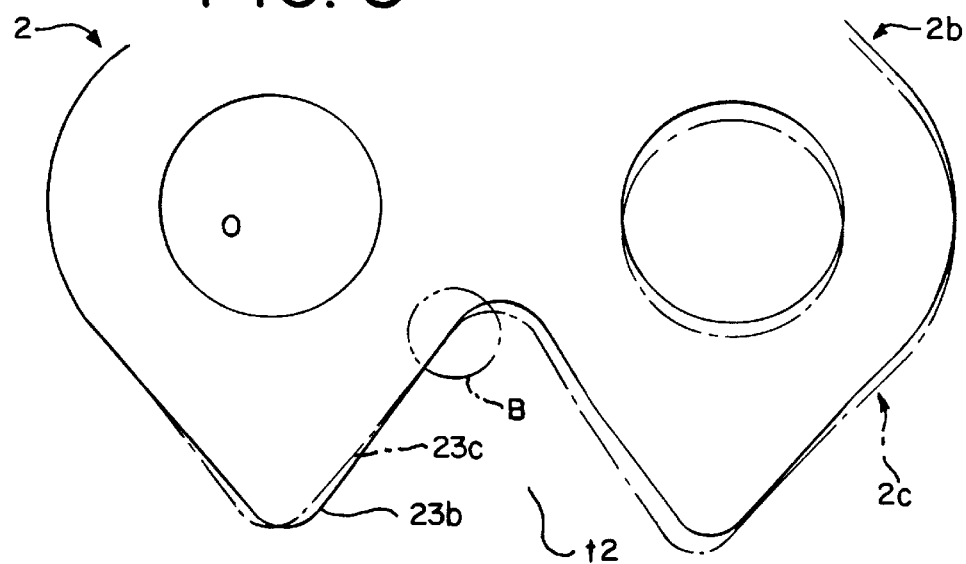
FIG. 5 shows the sprocket tooth surface curve generated by the link when the silent chain is wound on the sprocket and the link rotates around the tooth of sprocket.

FIG. 5 shows the sprocket tooth surface curve generated by link 2 when silent chain 1 is wound on the sprockets. The figure provides the locus of the movement of link 2 relative to the sprocket, when link 2 rotates using one of aperture center O on link 2 as the rotation center. In the figure, area t2 defined by the inner flank of link 2 indicates the sprocket tooth surface curve generated by the rotary movement of silent chain 1. The solid line in the figure shows the starting point of the initial engagement and the dot-dash line shows the end point of the initial engagement due to the rotary movement.

Figure 6:
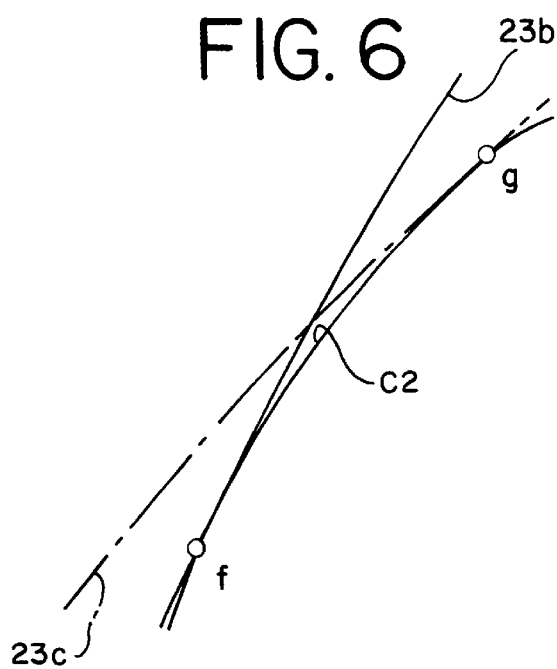
FIG. 6 shows part B of FIG. 5, enlarged.

FIG. 6 shows part B of FIG. 5, enlarged. Inner flank 23b of link 2b shown in the solid line contacts sprocket tooth t2 at contacting point f, while inner flank 23c of link 2c, shown in the dot-dash line, contacts sprocket tooth t2 at contacting point g. In the figure, sprocket tooth surface c2 of sprocket tooth t2 between contacting points f and g contacts both inner flanks 23b and 23c, forming the envelope of them.

Figure 7:
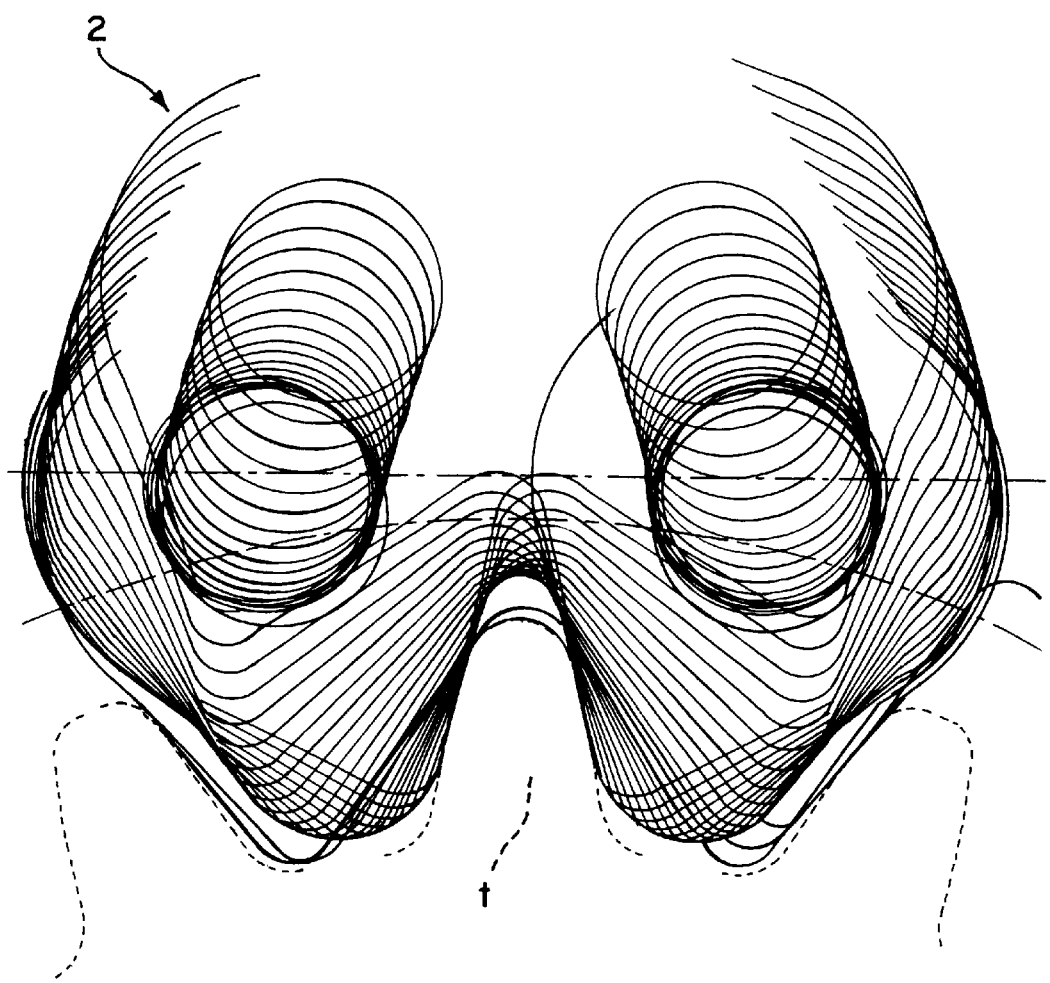
FIG. 7 shows the sprocket tooth surface curve generated based on a combination of the curves shown in FIG. 2 and FIG. 5.

FIG. 7 shows the sprocket tooth surface curve generated based on a combination of the curves shown in FIG. 2 and FIG. 5. The area shown in dash line defined by the inner flank of link 2 is the desirable sprocket tooth shape.

Figure 8:
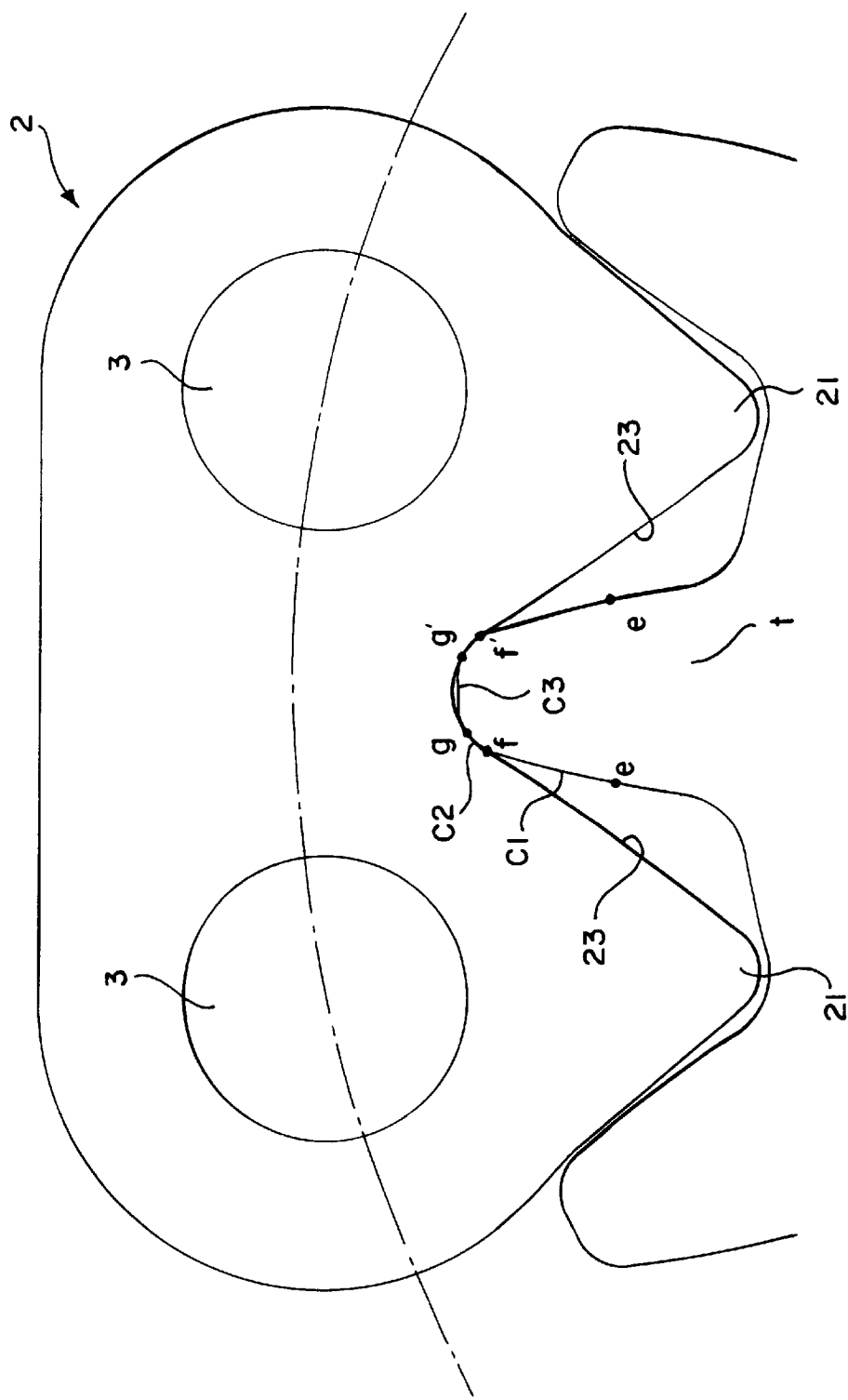
FIG. 8 is an enlarged drawing of the sprocket tooth surface curve generated based on the combination of curves shown in FIG. 2 and FIG. 5.

FIG. 8 is an enlarged drawing for sprocket tooth t generated based on the combination of the curves shown in FIG. 2 and FIG. 5 when link 2 fully engages with sprocket tooth t. In the figure, one engaging surface of sprocket tooth t is formed by connecting tooth surface curve c1 generated from the locus of the linear movement and tooth surface curve c2 generated from the locus of the rotary movement. The other engaging surface of sprocket tooth t is formed by connecting points e', f', and g', which are symmetrically related to points e, f, and g of contact of link 2 with the sprocket tooth. As shown in FIG. 8, curve c3 is used to connect points g and g' without interfering with the link 2 when fully engaged.

FIGS. 9–13 show the engaging process between the silent chain and the sprocket of the present invention.

Figure 9:
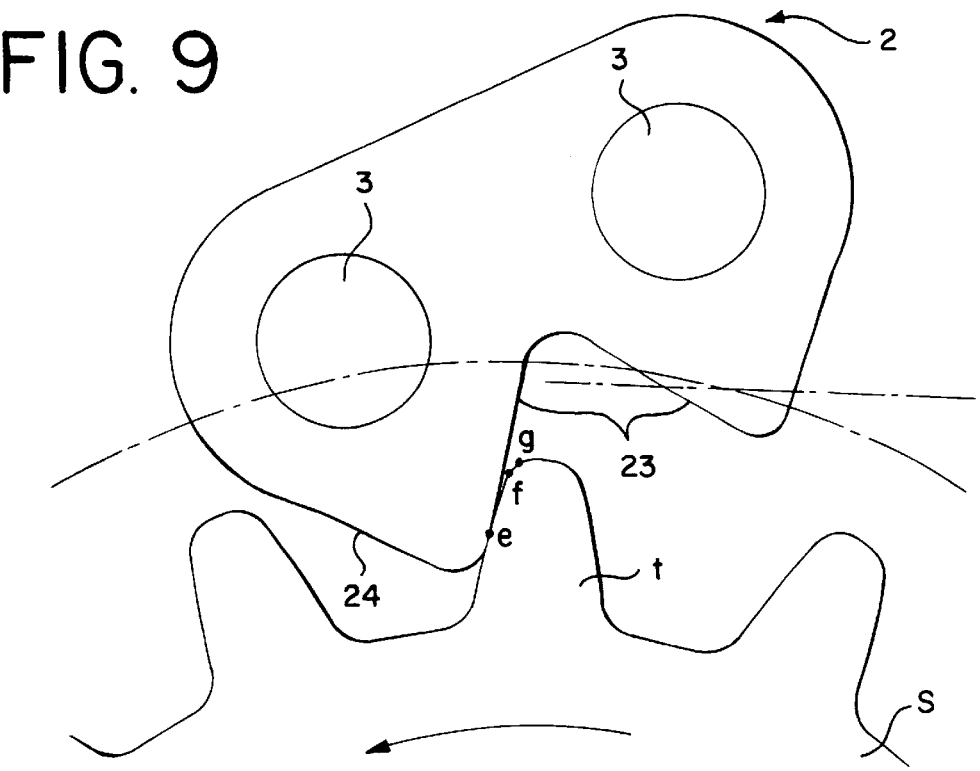
FIG. 9 shows the engaging process between the silent chain and the sprocket for the silent chain of the present invention.

As shown in FIG. 9, when the silent chain maintains a linear movement towards sprocket S, as the chain links first engage the sprocket teeth, the lower part (tooth tip) of inner flank 23 on link 2 in the frontmost series of the linear span contacts point e on the tooth surface of sprocket tooth t.

Figure 10:
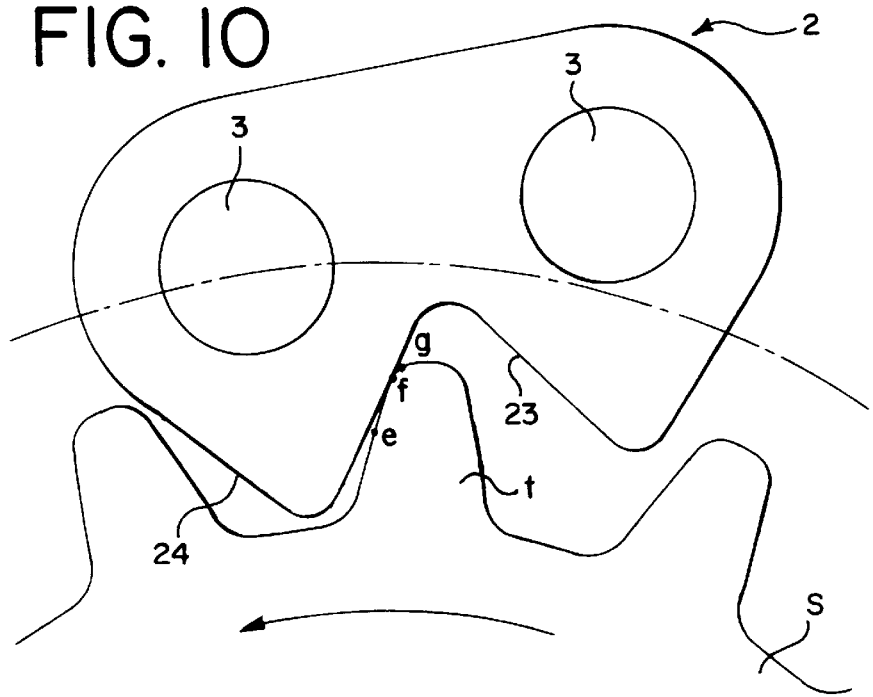
FIG. 10 shows the engaging process between the silent chain and the sprocket for the silent chain of the present invention.

As the engagement progresses due to the linear movement of the silent chain, inner flank 23 on link 2 contacts point f on the tooth surface of sprocket tooth t (see FIG. 10). In other words, the contacting point shifts from point e to point f.

As described above, sprocket tooth surface between contacting points e and f has a tooth surface curve the same as the envelope of the locus formed by the lower part of the inner flank of link 2 generated by the linear movement of the silent chain when engaging with sprocket S with minimal up and down vibration. Therefore, when the engaging point shifts, link 2 of the silent chain will not have any sudden or sharp impact on sprocket tooth t and will have minimal up and down vibration. The engagement with sprocket tooth t can be achieved through a smooth contact with sprocket tooth t. As a result, the noise generated at the initial stage of the engagement due to the impact of link 2 on sprocket tooth t can be significantly reduced.

Figure 11:
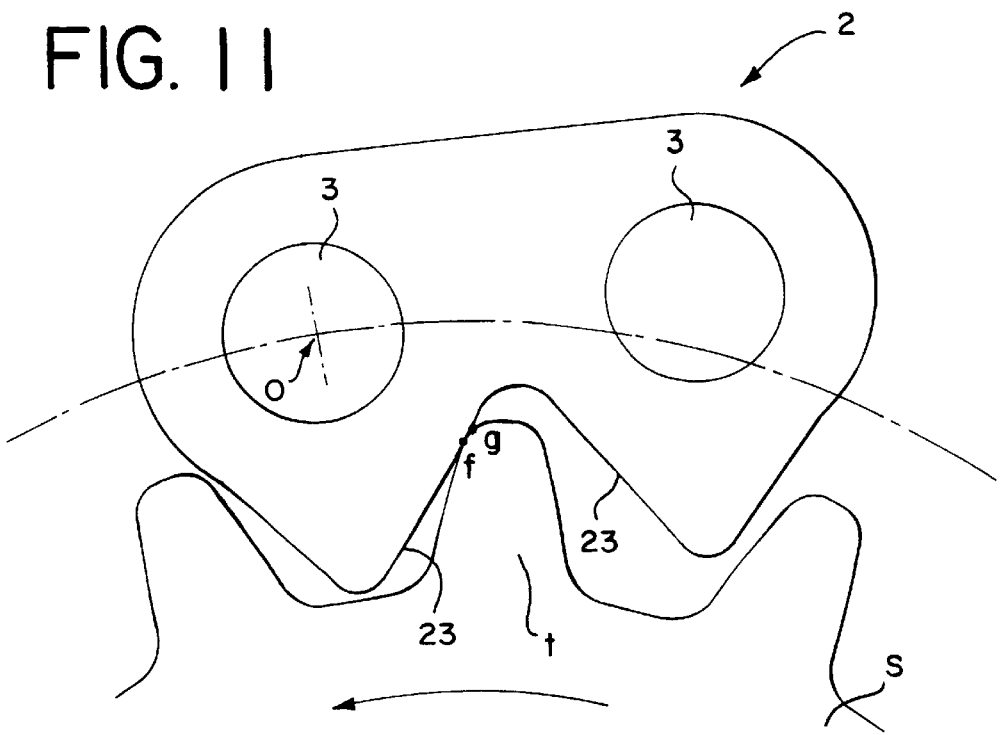
FIG. 11 shows the engaging process between the silent chain and the sprocket for the silent chain of the present invention.
Figure 12:
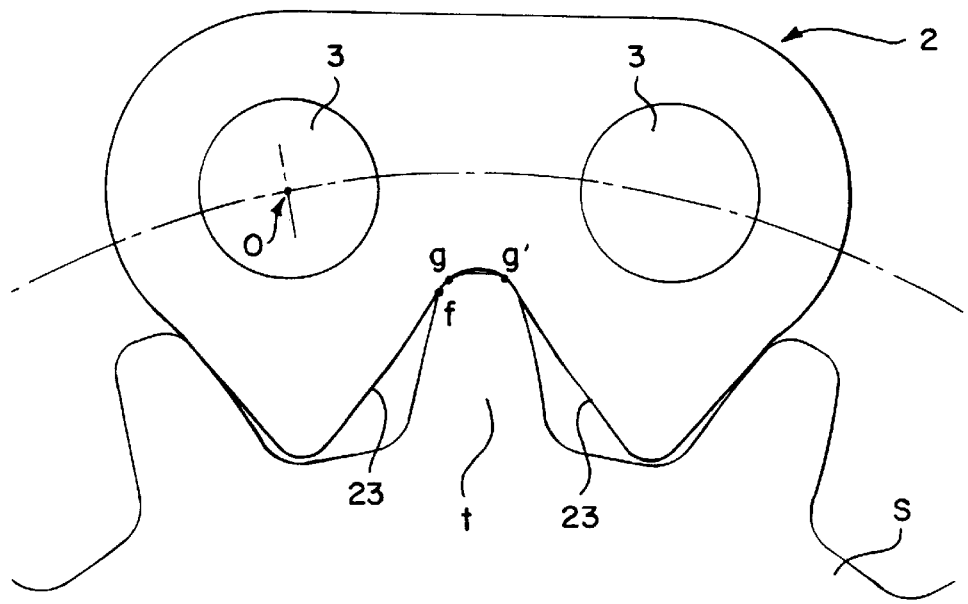
FIG. 12 shows the engaging process between the silent chain and the sprocket for the silent chain of the present invention.

Next, as the engagement progresses, the silent chain is wound on sprocket S as shown in FIGS. 11 and 12. Link 2 rotates around sprocket tooth t using aperture center O as the rotation center to achieve a full engagement when the upper part of the inner flank of link 2 reaches points g and g' on the sprocket tooth surface.

As described above, the sprocket tooth surface between contacting points f and g has a tooth surface curve the same as the envelope of the locus formed by the upper part of the inner flank of link 2 generated by the rotary movement of link 2.

Therefore, when the silent chain is wound on sprocket S and the link 2 rotates around sprocket tooth t, the upper part of the inner flank of link 2 reaches points g and g' on the sprocket tooth surface without causing any sudden or sharp impact on the sprocket tooth surface. As a result of smooth engagement, the noise generated at full engagement due to the impact of link 2 on sprocket tooth t can be significantly reduced.

In addition, the process of engagement is achieved by using inside contact in both initial engagement and full engagement (or seating) and the engaging point between link 2 and sprocket tooth t is always located on inner flank surface 23 from initial engagement to full engagement. By using such a structure, the sudden increase of the loading on the engaging point due to the shift of the engaging point observed for the chain structure, using the inside for initial engagement but the outside for full engagement, can be avoided. As a result, the noise can be reduced. In addition, the loading on each tooth of the sprocket can be decreased and the life of the sprocket can be extended.

FIG. 13 shows the movement of the engaging point on sprocket tooth t together with link 2 at full engagement. As shown in the figure, when link 2 of the silent chain starts to engage, the lower part of inner flank 23 contacts point e on the sprocket tooth surface. As the silent chain maintains its linear movement, the engaging point shifts from point e to point f.

Next, when the silent chain is wound on the sprocket and link 2 rotates, the engaging point shifts from point f to point g. At point g, the upper part of inner flank 23 of link 2 fully engages with sprocket tooth t. At the same time, the upper part of other inner flank 23 fully engages with sprocket tooth t at point g'.

As sprocket S further rotates, the silent chain is released from sprocket S. The engaging point on the sprocket tooth surface shifts from points g and g' to f'. At point e', which is symmetrically related to point e on the sprocket tooth surface, link 2 of the silent chain is released from sprocket tooth t.

According to the invention shown in these practical examples, the noise generated during the initial and full engagement can be significantly reduced and the vibration properties can be improved.

Moreover, in the present embodiments, the end point of the linear movement and the starting point of the rotary movement of the links are shown at the same point as f. However, the end point of the linear movement and the starting point of the rotary movement can be different. In this case, the two points can be connected by a curved surface, such as a circular arc.

In addition to the silent chains shown in the above embodiments, this invention may also be applied to other types of silent chains, such as the silent chain carrying a pair of teeth on each side of the pinhole central line which is capable of back drive.

In the silent chain transmission device of the present invention, the first part of the tooth surface on the sprocket which contacts the silent chain in the initial stage of the engagement has a tooth shape the same as the envelope for the locus of the lower part of the inner flank, which engages with the sprocket when the silent chain has a linear movement, with minimal engaging vibration, and the second part of the tooth surface on the sprocket which contacts the silent chain at the full engagement has a tooth shape the same as the envelope for the locus of the upper part of the inner flank which engages with the sprocket when the silent chain is wound on the sprocket and the link has a rotary movement. As a result, the noise generated by the silent chain transmission device can be reduced not only in the initial stage of the engagement but also when the chain and the sprocket are fully engaged, and vibration of the silent chain can be minimized.

Those skilled in the art to which the invention pertains may make modifications and other embodiments employing the principles of this invention without departing from its spirit or essential characteristics, particularly upon considering the foregoing teachings. The described embodiments are to be considered in all respects only as illustrative and not restrictive and the scope of the invention is, therefore, indicated by the appended claims rather than by the foregoing description. Consequently, while the invention has been described with reference to particular embodiments, modifications of structure, sequence, materials and the like would be apparent to those skilled in the art, yet still fall within the scope of the invention.

What is claimed is:

1. A silent chain and sprocket combination comprising:
    a silent chain having a plurality of interleaved links, each of said links having a pair of link teeth and a pair of apertures, each of said link teeth having an inner flank and an outer flank, said links being interconnected by connecting pins passing through said apertures;

a sprocket, said sprocket being used together with said silent chain, said sprocket having a plurality of sprocket teeth at an outer periphery, said inner flanks of said link teeth contacting a sprocket tooth when said silent chain is extended in a linear form for initial contact with said sprocket teeth and when said chain is wrapped and seated in full engagement on said sprocket; said sprocket teeth having a first part of a sprocket tooth surface which contacts a link tooth during said initial contact being the same shape as the shape of said inner flank of said link tooth in a locus of a lower part of said inner flank which engages with said sprocket tooth when said silent chain undergoes said linear movement, and said sprocket teeth having a second part of said sprocket tooth surface which contacts said link tooth during said full engagement being the same shape as the shape of said inner flank of said link tooth in a locus of an upper part of said inner flank which engages with said sprocket tooth when said silent chain is wound on said sprocket.

2. The silent chain of claim 1, wherein said first part and said second part of said sprocket tooth surface are connected through a curved surface which does not interfere with said link during engagement of said link with said sprocket.

\* \* \* \* \*